(12) United States Patent
Johnson

(10) Patent No.: US 7,477,256 B1
(45) Date of Patent: Jan. 13, 2009

(54) CONNECTING GRAPHICS ADAPTERS FOR SCALABLE PERFORMANCE

(75) Inventor: Philip B. Johnson, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 595 days.

(21) Appl. No.: 10/990,712

(22) Filed: Nov. 17, 2004

(51) Int. Cl.
*G06F 15/16* (2006.01)
*G06F 15/00* (2006.01)
*G06T 1/20* (2006.01)
*G06T 1/00* (2006.01)

(52) U.S. Cl. ............... 345/504; 345/502; 345/506; 345/501

(58) Field of Classification Search ........... 345/506, 345/505, 101, 619, 504, 502; 713/375, 400
See application file for complete search history.

(56) References Cited

U.S. PATENT DOCUMENTS

| | | | |
|---|---|---|---|
| 5,448,655 | A | 9/1995 | Yamaguchi |
| 5,784,628 | A | 7/1998 | Reneris |
| 5,794,016 | A | 8/1998 | Kelleher |
| 6,191,800 | B1 | 2/2001 | Arenburg et al. |
| 6,329,996 | B1 * | 12/2001 | Bowen et al. ............... 345/506 |
| 6,473,086 | B1 * | 10/2002 | Morein et al. ............... 345/505 |
| 6,501,999 | B1 | 12/2002 | Cai |
| 6,535,939 | B1 | 3/2003 | Arimilli et al. |
| 6,631,474 | B1 | 10/2003 | Cai et al. |
| 6,633,296 | B1 | 10/2003 | Laksono et al. |
| 6,683,614 | B2 * | 1/2004 | Walls et al. ............... 345/506 |
| 6,750,870 | B2 | 6/2004 | Olarig |
| 6,760,031 | B1 | 7/2004 | Langendorf et al. |
| 6,882,346 | B1 * | 4/2005 | Lefebvre et al. ............ 345/506 |
| 6,919,896 | B2 | 7/2005 | Sasaki et al. |
| 7,030,837 | B1 | 4/2006 | Vong et al. |
| 7,176,847 | B2 | 2/2007 | Loh |
| 2002/0047851 | A1 * | 4/2002 | Hirase et al. .............. 345/619 |
| 2002/0118201 | A1 * | 8/2002 | Mukherjee et al. .......... 345/504 |
| 2003/0128216 | A1 | 7/2003 | Walls et al. |

(Continued)

FOREIGN PATENT DOCUMENTS

EP 0571969 A2 12/1993

(Continued)

OTHER PUBLICATIONS

Whitman, Scott, "Dynamic Load Balancing for Parallel Polygon Rendering," IEEE Computer Graphics and Applications, IEEE Inc., New York, vol. 14, No. 4, Jul. 1, 1994.

(Continued)

*Primary Examiner*—Kee M Tung
*Assistant Examiner*—Jacinta Crawford
(74) *Attorney, Agent, or Firm*—Patterson & Sheridan, LLP

(57) ABSTRACT

A system and method for providing a dedicated digital interface between multiple graphics devices. The dedicated interface provides a point-to-point connection between each of the multiple graphics devices for the transfer of digital pixel data and synchronization signals. Graphics processing, including combining of portions of a displayable image, is distributed between the multiple graphics devices. One of the multiple graphics devices, a master graphics device converts the combined portions of the displayable image as needed for a specific display device.

22 Claims, 9 Drawing Sheets

U.S. PATENT DOCUMENTS

| | | | |
|---|---|---|---|
| 2003/0137483 A1* | 7/2003 | Callway | 345/101 |
| 2004/0104913 A1 | 6/2004 | Walls et al. | |
| 2005/0017980 A1 | 1/2005 | Chang et al. | |
| 2005/0088445 A1 | 4/2005 | Gonzalez et al. | |
| 2005/0134588 A1 | 6/2005 | Aila et al. | |
| 2005/0160212 A1 | 7/2005 | Caruk | |
| 2005/0278559 A1 | 12/2005 | Sutardja et al. | |

FOREIGN PATENT DOCUMENTS

| | | |
|---|---|---|
| FR | 2834097 A1 | 6/2003 |
| FR | 2839563 A1 | 11/2003 |
| JP | 5324583 A | 12/1993 |
| WO | WO 03/083636 A1 | 10/2003 |

OTHER PUBLICATIONS

"Alienware Announces Video Array and X2: An Exclusive Advancement in PC Graphics Technology", Alienware, May 12, 2004, <http://www.alienware.com/press_release_pages/press_release_template.aspx?FileName=press051204.asp>.

"Alienware Promises Fastest Graphics Solution", Alienware, Jun. 28, 2004, <http://www.alienware.com/press_release_pages/press_release_template.aspx?FileName=press062804.asp>.

"Frequently Asked Questions", Alienware, Oct. 22, 2004, <http://www.alienware.com/alx_pages/main_content.aspx>.

Henry Fuchs, Distributing a visible surface algorithm over multiple processors, Proceedings of the 1977 annual conference, p. 449-451. Jan. 1977.

Edward Brown, Andy Thome, "FireWire Audio Application utilizing high quality 96kHz 24bit I/O", Copyright Oxford Semiconductor 2004 © External—Free Release, Jul. 2004.

Wasson, "NVIDIA's SLI resurrects GPU teaming Kickin' it old school-with 32 pipes", www.techreport.com, Jun. 28, 2004, pp. 1-3, http://techreport.com/etc/2004q2/nvidia-sli/.

Weinand, "NVIDIA lance le SLI: une technologie multi-GPU", www.erenumerique.fr, Jun. 29, 2004. pp. 1-7 http://www.erenumerique.fr/nvidia_lance_le_sli_une_technologie_multi_gpu-art-655-7.html.

International Search Report mailed Feb. 26, 2007.

Marc Prieur, NVIDIA GeForce 6600 GT—Hardware.fr, Sep. 7, 2004, retrieved from http://www.hardware.fr/art/imprimer/514. pp. 1-23.

English translation of: Marc Prieur, "NVIDIA GeForce 6600 GT—Hardware.fr," Sep. 7, 2004, retrieved from http://www.hardware.fr/art/imprimer/514. pp. 1-24.

Scott Wasson, "NVIDIA's SLI Resurrects GPU Teaming: Kickin' It Old School—With 32 Pipes", Jun. 28, 2004, retrieved from http://techreport.com/articles.x/6931. 5 pgs.

PCT Search Report. Oct. 12, 2007.

Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

English Translation of: Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

* cited by examiner

CONNECTING GRAPHICS ADAPTERS FOR SCALABLE PERFORMANCE

BACKGROUND OF THE INVENTION

1. Field of the Invention

One or more aspects of the invention generally relate to graphics processing, and more particularly to connecting graphics processors in a multi-processor graphics processing system.

2. Description of the Related Art

Conventional multi-processor graphics processing systems, such as 3dfx's VooDoo2™ graphics adapter product configured for scan line interleave (SLI) or Metabyte/Wicked 3D's parallel graphics configuration (PGC), increase graphics processing performance by using two or more graphics adapters. Motherboard 100, shown in FIG. 1, is an example of a conventional multi-processor graphics processing system. Motherboard 100 includes a host processor 120, a main memory 110, and a chipset 130 which is provides an industry standard interface, specifically peripheral component interface (PCI), to each graphics adapter 140. A first graphics adapter 140 and a second graphics adapter 140 are each coupled to motherboard 100 via connectors and instructions and data are broadcast from host processor 120 via PCI bus 142. The first graphics adapter 140 renders a first half, e.g. odd scan lines or the top half, of an image for display on a display 170 and the second graphics adapter 140 renders a second half of the image.

The first graphics adapter 140 converts the digital data for the first half of the image to the analog domain using a first digital to analog converter (DAC) within an analog combining unit 150 and outputs analog video signals to an analog combining unit 150 within the second graphics adapter 140 using a proprietary cable 145 configured to transfer analog signals. The second graphics adapter 140 converts the digital data for the second half of the image to the analog domain using a second DAC within another analog combining unit 150. The analog combining unit 150 within the second graphics adapter 140 combines the analog video signals received from the first graphics adapter 140 with analog video signals generated based on the second half of the image to produce an analog video output for the entire image. The analog video output for the entire image is output to display 170. Differences in video timing and DAC calibration between the first graphics adapter 140 and the second graphics adapter 140 introduces visual artifacts, such as tearing and color variations, during display of the entire image.

Accordingly, it is desirable to facilitate installation of two or more graphics adapters to produce an image free of artifacts resulting from video timing and DAC calibration differences.

SUMMARY OF THE INVENTION

The current invention involves new systems and methods for providing a dedicated interface between two graphics adapters. A proprietary digital interface connects the two graphics adapters, providing the dedicated interface. Digital pixel data and synchronization signals are transferred between a slave graphics adapter and a master graphics adapter. The master graphics adapter generates the video timing and converts the digital pixel data for display.

Various embodiments of the invention include a graphics processor including a dedicated interface. The graphics processor includes a combiner unit, a final pixel processing unit, and a raster lock unit. The combiner unit is configured to select between locally generated pixel data and pixel data produced by a slave graphics device and received by a first dedicated interface on a pixel-by-pixel basis to produce combined pixel data. The combined pixel data is output to a second dedicated interface. The final pixel processing unit is coupled to the selection unit and configured to receive the combined pixel data and produce a displayable image for output to a display device. The raster lock unit is coupled to the combiner unit and configured to generate synchronization signals for synchronizing the displayable image output to the display device when the graphics processor is a master graphics device.

Various embodiments of a method of the invention for combining pixel data produced by multiple graphics devices, within a single graphics processor to produce displayable image data, include processing first graphics data and processing second graphics data. The first graphics data is processed within a first graphics device to produce first pixel data that is output to a dedicated interface to a second graphics device. The second graphics data is processed within the second graphics device to produce second pixel data. Combined pixel data is produced by selecting between the first pixel data and the second pixel data within the second graphics device based on raster position information. The combined pixel data is processed to produce the displayable image data for direct output to a display device or output to a second dedicated interface coupled to a third graphics device.

Various embodiments of the invention include a multi-processor graphics interface for scaling performance of multiple graphics devices. The multi-processor graphics interface includes pixel data, synchronization signals, and a buffer swap signal. The pixel data is produced by a first graphics device and output to a second graphics device. The synchronization signals are generated by the second graphics device for a display device and received by the first graphics device. The buffer swap signal is controlled by the first graphics device and the second graphics device and sampled by first graphics device and the second graphics device.

BRIEF DESCRIPTION OF THE DRAWINGS

Accompanying drawing(s) show exemplary embodiment(s) in accordance with one or more aspects of the present invention; however, the accompanying drawings(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A dedicated interface provides a point-to-point connection between each of the multiple graphics adapters for the transfer of digital pixel data and synchronization signals. A buffer management signal, buffer swap used to control the output of the digital pixel data may be included in the dedicated interface. Graphics processing, including combining of portions of a displayable image, may be distributed between the multiple graphics adapters. Each of the multiple graphics adapters combines a portion of pixel data for the displayable image with pixel data produced by and received from any other of the multiple graphics adapters. One of the multiple graphics adapters, a master graphics adapter converts the combined portions of the displayable image as needed for a specific display device, for example performing digital to analog conversion using a DAC. Because a single device, the master graphics adapter performs the digital to analog conversion artifacts resulting from DAC mismatches between the multiple graphics adapters are not introduced into the displayable image.

Figure 1:
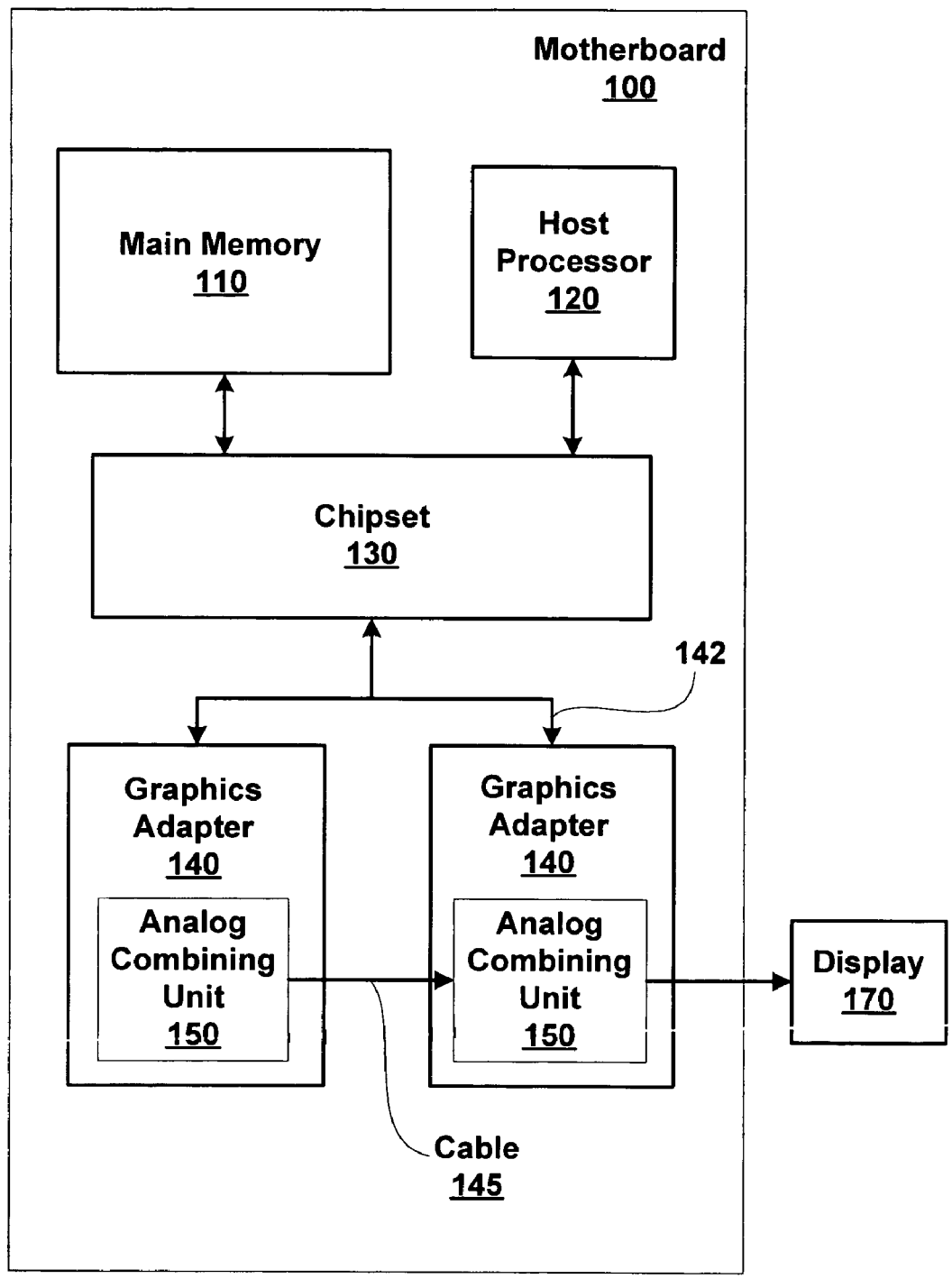
FIG. 1 is block diagram of an exemplary embodiment of a prior art motherboard for a multi-processor graphics processing system.
Figure 2:
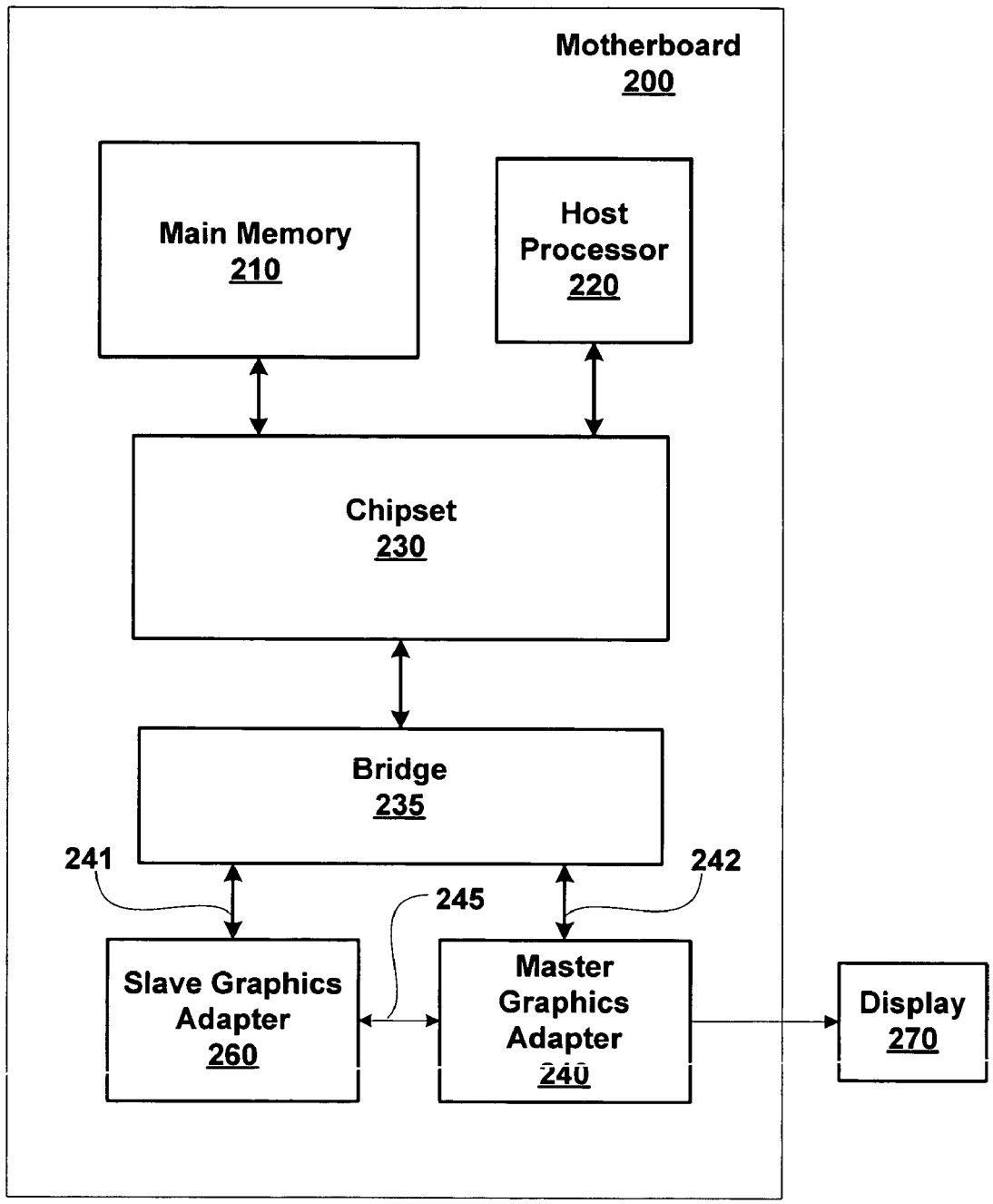
FIG. 2 is a block diagram of the exemplary embodiment of a motherboard for a multi-processor graphics processing system.

FIG. 2 is a block diagram of the exemplary embodiment of a motherboard for a multi-processor graphics processing system. Motherboard 200 may be included within a desktop computer, server, laptop computer, palm-sized computer, tablet computer, game console, cellular telephone, computer based simulator, or the like. Motherboard 200 includes a host processor 220, a main memory 210, and a chipset 230 that is directly coupled to a bridge 235.

In some embodiments of motherboard 200, chipset 230 may include a system memory bridge and an input/output (I/O) bridge that may include several interfaces such as, Advanced Technology Attachment (ATA) bus, Universal Serial Bus (USB), Peripheral component interface (PCI), or the like. Bridge 235 provides an interface between chipset 230 and a master graphics adapter 240 and a slave graphics adapter 260. In some embodiments of the present invention, interfaces 241 and 242 conform to an industry standard interface specification, such as peripheral component interface express (PCI-Express™). Furthermore, in one embodiment of the present invention, the functionality of bridge 235 is included within chipset 230. In the one embodiment, bridge 235 is omitted and chipset 230 interfaces directly with master graphics adapter 240 and slave graphics adapter 260.

Figure 3A:
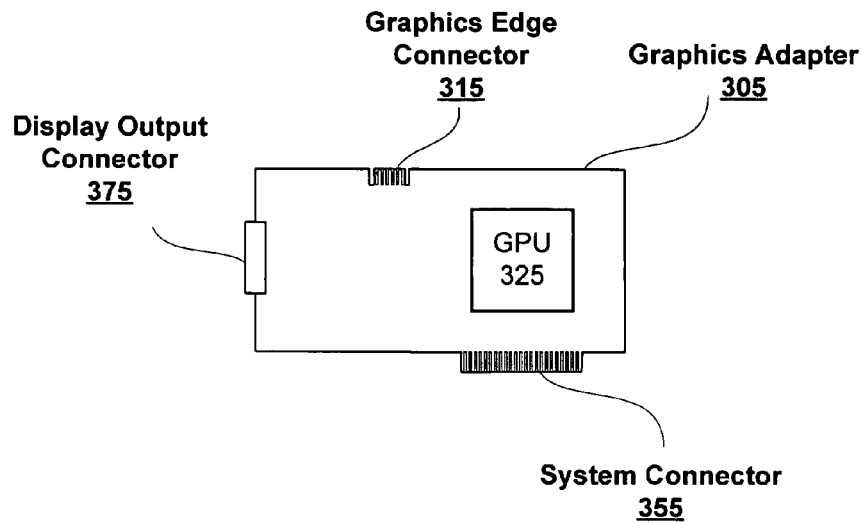
FIG. 3A is an exemplary embodiment of a graphics adapter in accordance with one or more aspects of the present invention.
Figure 3B:
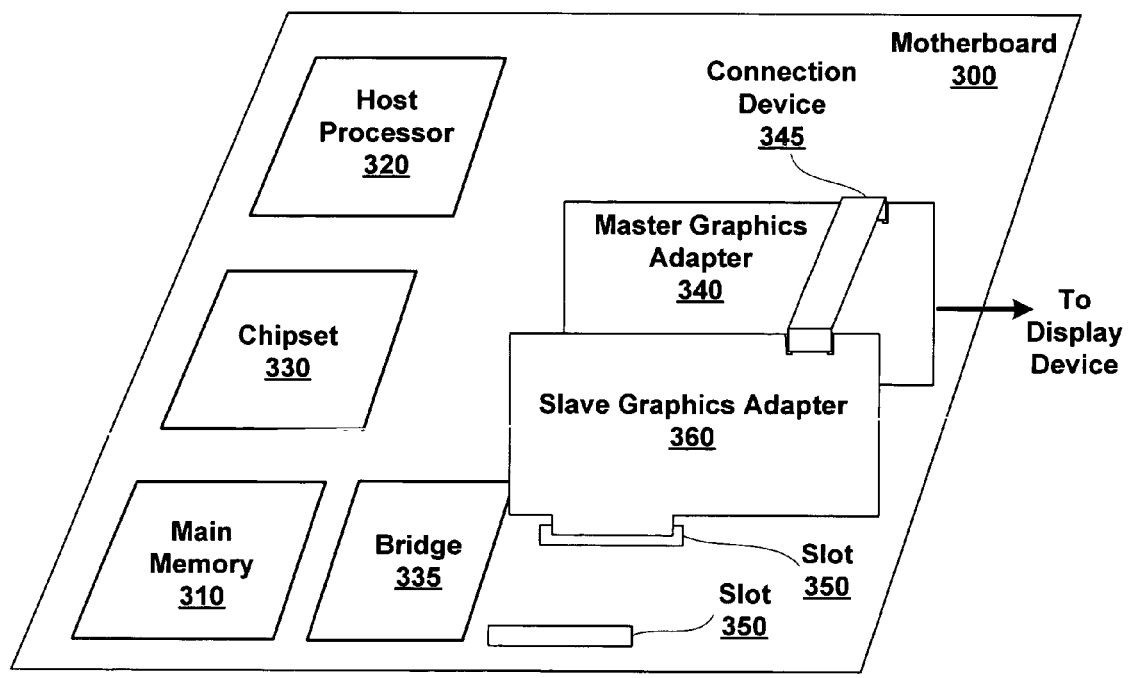
FIG. 3B is an exemplary embodiment of a motherboard for a multi-processor graphics processing system in accordance with one or more aspects of the present invention.

Master graphics adapter 240, is typically a printed circuit board (PCB) which is coupled to connection 242 when installed in a first slot, as described in conjunction with FIGS. 3A and 3B. Slave graphics adapter 260 is coupled to connection 241 when installed in a second slot. In some embodiments of the present invention additional graphics adapters may be installed in additional slots and bridge 235 may provide an interface for each additional slot. Master graphics adapter 240 and secondary graphics adapter 260 may each include one or more graphics processors and dedicated memory which may be used to store graphics data, such as texture maps, image data, and program instructions.

A primary connection between master graphics adapter 240 and one or more slave graphics adapters 260 is provided by the interfaces via bridge 235. In some embodiments of the present invention, the primary connection couples master graphics adapter 240 and one or more slave graphics adapters 260 through bridge 235, chipset 230, and main memory 210 and data transfers between master graphics adapter 240 and the one or more slave graphics adapters 260 are controlled by host processor 220. A dedicated interface 245 provides a secondary connection between master graphics adapter 240 and one or more slave graphics adapters 260. The secondary connection is used to transfer pixel data produced by slave graphics adapter 260 from slave graphics adapter 260 to master graphics adapter 240, thereby offloading pixel data transfers from the primary connection.

Using dedicated interface 245 between two or more graphics adapters facilitates efficient transfer of graphics data and synchronization signals between the two or more graphics adapters while reducing system bandwidth. Furthermore, users can easily install each graphics adapter as desired to improve rendering performance in terms of image quality or rendering speed. For example, two or more graphics adapters may be used to render images with improved image quality or two or more graphics adapters may be used to render images at a higher frame rate.

Dedicated interface 245 between master graphics adapter 240 and slave graphics adapter 260 is provided by a connection device. The connection device may be a connector PCB with a socket affixed to opposing ends of the connector PCB. Conductive traces fabricated as part of the connector PCB directly connect pins of the socket on one end of the connector PCB to pins of the other socket on the opposing end of the connector PCB. Another embodiment of a connection device includes a connector flexible cable with a socket affixed to each end of the connector flexible cable. The connector flexible cable includes wires within a flexible insulating wrapping that directly connect pins of one socket on one end of the connector flexible cable to pins of the other socket on the opposing end of the connector flexible cable. Those skilled in the art will recognize that other components and mechanisms may be employed to produce a connection device.

Dedicated interface 245 provides a multi-bit connection for several signals. For example, pixel data may be transferred from a slave graphics device to a master graphics device or to another slave graphics device using a number of single bit connections for data, a data valid signal, and a clock. The master graphics device outputs image data directly to a display device. In contrast, a slave graphics device outputs pixel data to a master graphics device, sometimes through another slave graphics device. The pixel data and data valid may be transferred on one or both edges of the clock. One or more buffer management signals may also be connected between graphics adapters using the connection device. In some embodiments of the present invention, a buffer management signal indicates when all of the graphics processors producing pixel data for a display should swap buffers, i.e., swap the back buffer with the front buffer. Synchronization signals may also be transferred from a master graphics device to a slave graphics device to communicate the display raster position.

Master graphics adapter 240 outputs image data to a display device, display 270. Examples of display devices known in the art include a cathode ray tube (CRT), flat panel display, or the like. Slave graphics adapter 260 may process a larger portion of an image than master graphics adapter 240 and transfer pixel data for the larger portion of the image to master graphics adapter 240 via dedicated interface 245. In some embodiments of the present invention, processing of the image may be distributed between master graphics adapter 240 and one or more slave graphics adapters 260 based on the processing capability of each graphics adapter. Furthermore, a buffer swap and synchronization signals, e.g., horizontal sync, and vertical sync, may be transferred between slave graphics adapter 260 and primary graphics adapter 240 using dedicated interface 245.

FIG. 3A is an exemplary embodiment of a graphics adapter 305 in accordance with one or more aspects of the present invention. Graphics adapter 305 may be master graphics adapter 340 or slave graphics adapter 306. Typically a PCB including a finger-type system connector 355 that is configured to connect to a system motherboard slot supports Graphics adapter 305. Conductive "fingers" are affixed to the PCB when graphics adapter 305 is manufactured to produce system connector 355. System connector 355 typically conforms to an industry standard interface specification, such as PCI-Express™. In some embodiments of the present invention system connector 355 is replaced with a socket-type connector or a connector that is affixed to the PCB during the manufacturing process.

A GPU (graphics processing unit) 325 is affixed to a PCB supporting graphics adapter 305 and is coupled to system connector 355 by wire traces on the PCB. GPU 325 typically receives graphics data and instructions from a host processor through system connector 355. GPU 325 is also coupled to a finger-type graphics edge connector 315 by wire traces on the PCB. A display output connector 375 is typically exposed through an enclosure containing graphics adapter 100 installed on a motherboard so that an end-user may connect a display device input connector to display output connector 130.

When multiple graphics adapters are installed in a system and GPU 325 is configured as a slave graphics device, GPU 325 outputs pixel data (processed graphics data) to graphics edge connector 315. When one or more graphics adapters are installed in a system and GPU 325 is configured as a master graphics device, GPU 325 outputs pixel data to a display output connector 315 using wire traces on the PCB. In some embodiments of the present invention, when GPU 325 is configured as a master graphics device and multiple graphics adapters are installed in a system, GPU 325 outputs synchronization signals, e.g. horizontal and vertical sync, to graphics edge connector 315.

In some embodiments of the present invention, graphics edge connector 315 includes signals for two ports, one for use when GPU 325 is configured as a slave graphics device and another for use when GPU 325 is configured as a master graphics device. When multiple slave devices are installed in a system, both ports are used on each slave device that receives pixel data from another slave device. In other embodiments of the present invention, graphics edge connector 315 includes signals for a single port and the signals input and output by GPU 325 to/from the port vary depending on whether GPU 325 is configured as a master graphics device or as a slave graphics device. In some embodiments of the present invention, additional ports are available to provide additional dedicated interfaces.

FIG. 3B is an exemplary embodiment of a motherboard 300 for a multi-processor graphics processing system in accordance with one or more aspects of the present invention. Motherboard 300 includes the elements shown in motherboard 200 of FIG. 2 with a dedicated interface formed by a connection device 345 directly coupling two graphics adapters, a master graphics adapter 340 and a slave graphics adapter 360. Host processor 320, chipset 330, main memory 310, bridge 335, and connection device 345 within motherboard 300 correspond to host processor 220, chipset 230, main memory 210, bridge 235, and connection 245 within motherboard 200.

A master graphics adapter, such as master graphics adapter 340, is coupled to motherboard via a slot 350. A slave graphics adapter, such as slave graphics adapter 360, is coupled to motherboard via another slot 350. In some embodiments of the present invention, an additional slave or master graphics adapter may be installed in a slot 350. One or more slave graphics adapters 360 may provide pixel data to master graphics adapter 340 via dedicated interfaces, as described in conjunction with FIGS. 3C and 3D.

In some embodiments of the present invention, connection device 345 configures each graphics adapter coupled to it as either a master graphics adapter or as a slave graphics adapter. For example, a single bit connection within each socket of connection device 345 configures master graphics adapter 340 as a master graphics adapter and configures slave graphics adapter 360. Specifically, a graphics driver reads the state of the single bit connection set by connection device 345 and configures each graphics adapter accordingly. In those embodiments of the present invention, the configuration of master and slave may be reversed by installing connection device 345 after rotating it by 180 degrees.

Figure 3C:
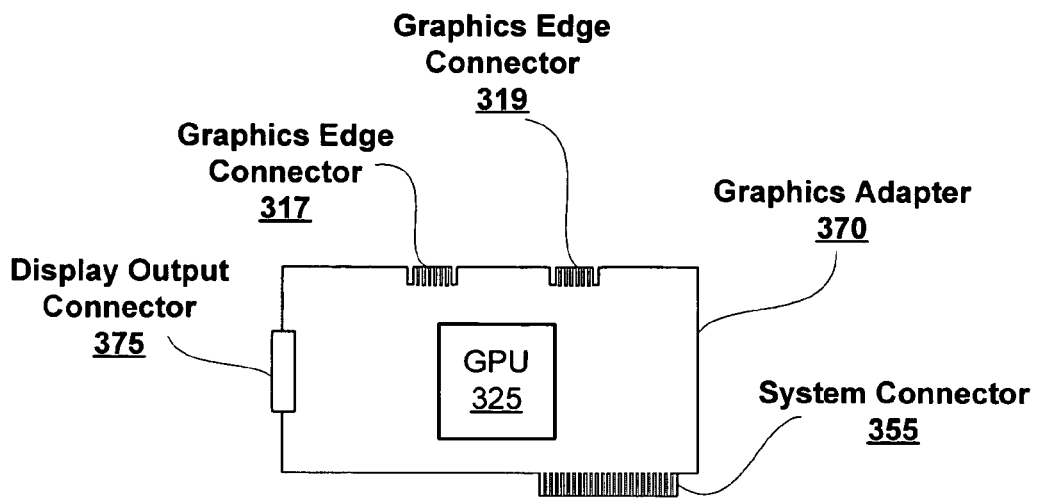
FIG. 3C is another exemplary embodiment of a graphics adapter in accordance with one or more aspects of the present invention.
Figure 3D:
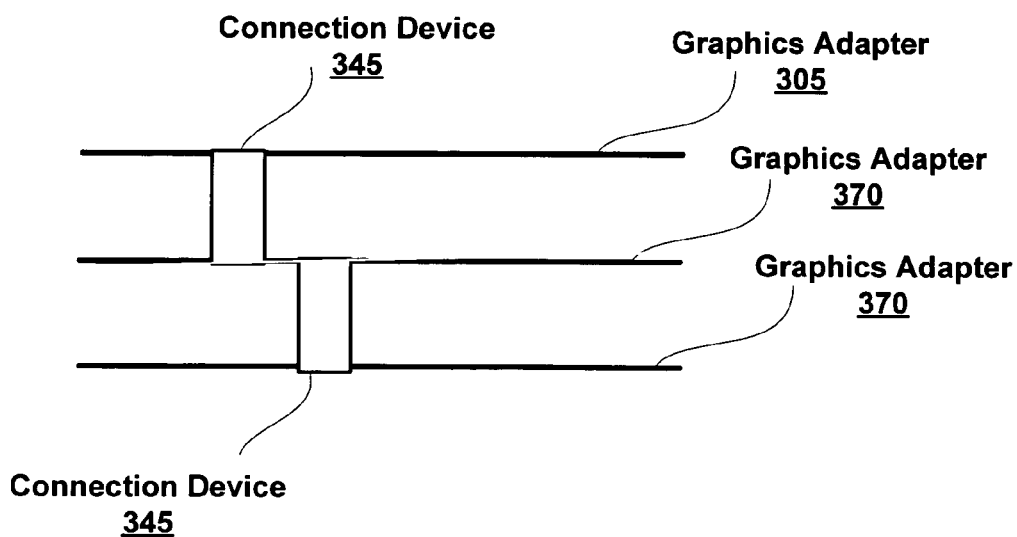
FIG. 3D is an exemplary embodiment of a multi-graphics adapter configuration in accordance with one or more aspects of the present invention.

FIG. 3C is an exemplary embodiment of a graphics adapter configuration in accordance with one or more aspects of the present invention. A graphics adapter 370 differs from graphics adapter 305 in that it has a second "finger" used to connect to a second connection device, such as connection device 345. Graphics adapter 370 includes GPU 325 coupled to system connector 355 and to graphics edge connectors 317 and 319. Signals included in a dedicated interface are routed through graphics edge connectors 317 and 319 to couple two or more graphics adapters as shown in FIG. 3D. Although graphics edge connectors 317 and 319 are positioned on the side of graphics adapter 370 opposing system connector 355, one or both graphics edge connectors 317 and 317 may be positioned on a different side of graphics adapter 370.

Graphics adapter 370 may be positioned between a slave graphics adapter and either a master graphics adapter or another slave graphics adapter. GPU 325 provides signals for two ports, a slave port and a master port, and each port is coupled to a single graphics edge connector. GPU 325 may be configured to receive pixel data via one of connectors 317 or 319 and to output pixel data via connector 317 or 319, respectively. GPU 325 is directly coupled to display output connector 375. However, in some embodiments of the present invention, display output connector 375 may be omitted from graphics adapter 305 or 370 to provide a graphics adapter that functions as an accelerator without a display output.

FIG. 3D is an exemplary embodiment of multi-graphics device configuration in accordance with one or more aspects of the present invention. Multiple graphics devices, graphics adapter 305 and graphics adapters 370, are coupled together using two connection devices 345. Each connection device 345 provides a point-to-point dedicated interface between two of the multiple graphics devices. Specifically, a first connection device 345 couples graphics adapter 305 and a first graphics adapter 370 via graphics edge connectors. Therefore, the first connection device 345 may couple graphics edge connector 315 to graphics edge connector 317. Graphics adapter 305 may be configured as a slave graphics adapter providing pixel data to the first graphics adapter 370 which may be configured as either a slave graphics adapter or a master graphics adapter. Alternatively, graphics adapter 305 may be configured as a master graphics adapter receiving pixel data from the first graphics adapter 370.

A second connection device 345 couples the first graphics adapter 370 and a second graphics adapter 370 via graphics edge connectors 319. The second graphics adapter 370 may be configured as a slave graphics adapter providing pixel data to the first graphics adapter 370 which may be configured as either a slave graphics adapter or a master graphics adapter. Alternatively, the second graphics adapter 370 may be configured as a master graphics adapter receiving pixel data from the first graphics adapter 370.

When the first graphics adapter 370 is configured as a master graphics adapter it may receive pixel data from graphics adapter 305 and the second graphics adapter 370. When either graphics adapter 305 or the second graphics adapter 370 is configured as a master graphics adapter it may receive pixel data from the second graphics adapter 370 or graphics adapter 305, respectively, through the first graphics adapter 370. Those skilled in the art will recognize that other configurations of the multiple graphics adapters may be used to produce image data for one or more display devices.

Figure 4A:
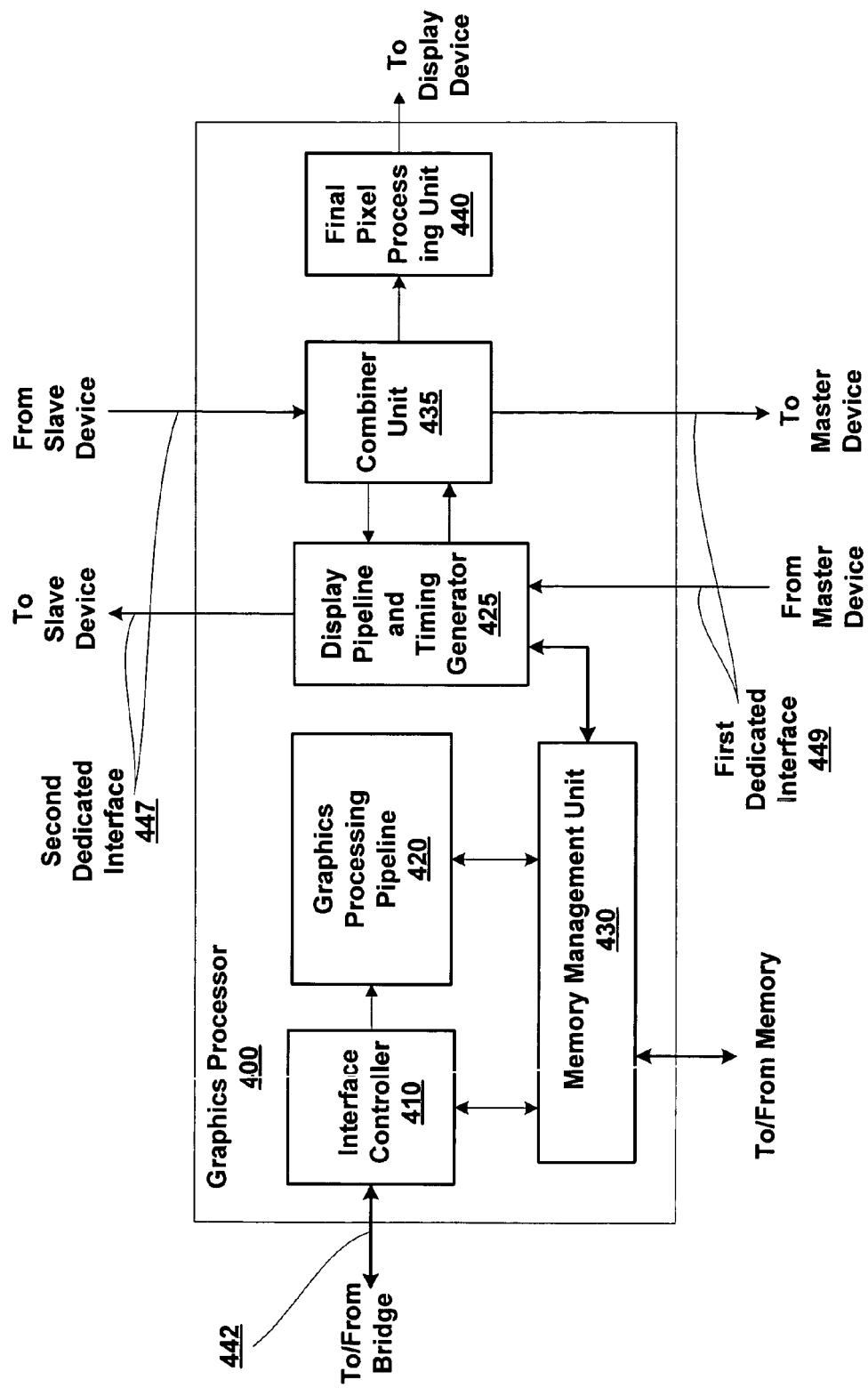
FIG. 4A is a block diagram of an exemplary embodiment of a graphics processor in accordance with one or more aspects of the present invention.

FIG. 4A is an exemplary embodiment of a graphics device, graphics processor 400, in accordance with one or more aspects of the present invention. Graphics processor 400 may be a GPU, such as GPU 325, included within a graphics adapter, such as master graphics adapters 240 or 340 or slave graphics adapters 260 or 360. Graphics processor 400 includes an interface controller 410 that provides signals to and from bridge 235 via a primary connection, connection 442. Connection 442 corresponds to connections 241 or 242, which confirm to an interface specification and are coupled to a motherboard via slot 250.

Interface controller 410 outputs program instructions and data to graphics processing pipeline 420 for processing. Graphics processing pipeline 420 performs rendering functions and outputs the pixel data to a frame buffer via memory management unit 430. Interface controller 410 and graphics processing pipeline 420 each output read and write requests to memory management unit 430 to access memory included in the graphics adapter, such as frame buffer memory. Memory management unit 430 may output read and write requests to interface controller 410 when the memory to be read or written is outside of the graphics adapter, such as system memory.

A display pipeline and timing generator 425 reads pixel data stored in the frame buffer memory via memory management unit 430, composites pixel data with any overlay surface, base surface, icon, cursor, or the like, and outputs the pixel data to a combiner unit 435. When graphics processor 400 is configured as a master graphics device, display pipeline and timing generator 425 generates the synchronization signals, specifically a horizontal sync, a vertical sync, data enable, blanking periods, and the like, using techniques known to those skilled in the art. The synchronization signals are output to a display device and to one or more slave graphics devices via the second dedicated interface 447. Display pipeline and timing generator 425 also controls the buffer swap signal based on a swap signal received from graphics processing pipeline 420.

When graphics processor 400 is configured as a slave graphics device, display pipeline and timing generator 425 receives the synchronization signals from a master graphics device via a first dedicated interface 449. Display pipeline and timing generator 425 outputs the synchronization signals to any other slave graphics devices via the first dedicated interface 447. The synchronization signals, either generated by display pipeline and timing generator 425 or received by display pipeline and timing generator 425, are used to generate read requests for particular pixel positions. Pixel data corresponding to the particular pixel positions is read from the frame buffer and output by display pipeline and timing generator 425 to combiner unit 435. Raster position information, e.g., pixel position information, is also output by display pipeline and timing generator 425 to combiner unit 435.

Combiner Unit 435 receives pixel data from two sources. A first source is locally generated pixel data produced by graphics processing pipeline 420 and read from the frame buffer by display pipeline and timing generator 425. A second source is pixel data produced by a slave graphics device (graphics adapter or GPU) and received via a second dedicated interface 447. Combiner Unit 435 selects between the locally generated pixel data and the pixel data received via second dedicated interface 447 to produce combined pixel data. Display pipeline and timing generator 425 provides combiner unit 435 with the raster position information which is used to determine which pixel data source to select to produce the combined pixel data. In some embodiments of the present invention, display pipeline and timing generator 425 also provides combiner unit 435 with the buffer swap signal which is used to determine which pixel data source to select to produce the combined pixel data.

The combined pixel data is output to either a final pixel processing unit 440 or to a slave graphics device or a master graphics device via the first dedicated interface 449. When graphics processor 400 is configured as a slave graphics device, combiner unit 440 outputs the combined pixel data to the master graphics device (optionally through a slave graphics device) via the first dedicated interface 449. When graphics processor 400 is configured as a master graphics device, combiner unit 435 outputs the combined pixel data to final pixel processing unit 440.

Final pixel processing unit 440 processes the combined pixel data received from combiner unit 435 to produce displayable image data for direct output to a display device. In some embodiments of the present invention, the pixel data produced by graphics processing pipeline 420 is not scaled for a specific display. For example, when a fixed resolution display device, such as a flat panel, is used, the pixel data may be upscaled to match the fixed resolution. Final pixel processing unit 440 converts the combined pixel data as needed for display, for example, performing digital to analog conversion. Final pixel processing unit 440 may also process the combined pixel data for representation in a variety of formats, such as HDTV (high definition television), SDTV (standard definition television), or the like. Furthermore, final pixel processing unit 440 may process the combined pixel data for other display monitor resolutions that are supported by the display device connected to display output connector 375 such as display monitor resolutions specified in VESA's (video electronics standards association) monitor timing specifications. In some embodiments of the present invention, final pixel processing unit 440 may output to multiple display devices simultaneously.

Figure 4B:
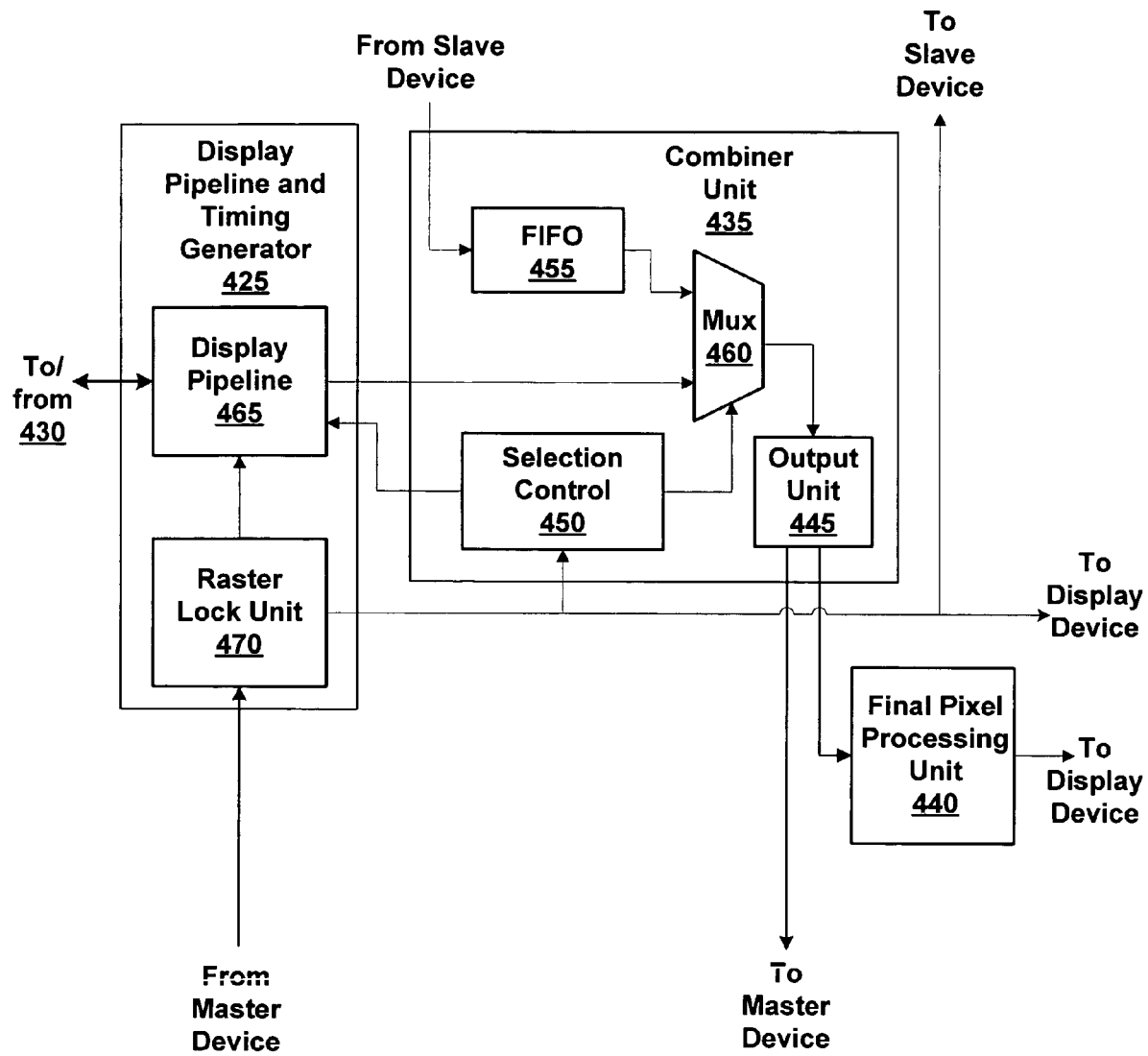
FIG. 4B is a block diagram of an exemplary embodiment of a portion of the graphics processor shown in FIG. 4A in accordance with one or more aspects of the present invention.

FIG. 4B is a block diagram of an exemplary embodiment of a portion of the graphics processor shown in FIG. 4A in accordance with one or more aspects of the present invention. In one embodiment of the present invention, 12 bits of pixel data (24 bits at a double data rate), a data enable signal, and a clock are output by a slave graphics device. When combiner unit 435 is within a graphics processor configured as a master graphics device or when it is configured as a slave graphics device and multiple slave graphics devices are used, combiner unit 435 receives pixel data from a slave graphics device. A FIFO (first-in first-out memory) 455 within combiner unit 435 stores the pixel data when the data enable signal indicates pixel data is valid. The pixel data may be transferred on one or both edges of the clock. In some embodiments of the present invention, FIFO 455 is replaced by another storage resource, such as a register file or the like.

A display pipeline 465 within display pipeline and timing generator 425 reads locally generated pixel data from the frame buffer stored in memory via memory management unit 430 and composites the pixel data with any overlay surface, base surface, icon, cursor, or the like. Display pipeline 465 receives the raster position information from a raster lock unit 470 which is used to generate the frame buffer read requests. The raster position information indicates the current horizontal and vertical pixel position within the displayable image. Display pipeline 465 outputs the locally generated pixel data to combiner unit 435.

A mux (multiplexor) 460 is controlled by a selection control 450 to output either pixel data read from FIFO 455 or the locally generated pixel data produced by graphics processing pipeline 420. The selection may be changed on a pixel-by-pixel, scanline-by-scanline, frame-by-frame basis. Each selection control 450 within a particular graphics processor is programmed based on the portion of the image that particular graphics processor is producing. In some embodiments of the present invention, each graphics processor may be programmed to process a pixel area that is a number of scanlines, either contiguous or alternating. In other embodiments of the present invention, each processor may be programmed to process a pixel area that is a specific rectangular region of the image. In some embodiments of the present invention, the pixel area defining the pixels a particular graphics device processes is fixed for the particular graphics device.

Selection control 450 receives raster position information from raster lock unit 470 within display pipeline and timing generator 425. Raster lock unit 470 includes timing generation circuitry which generates the synchronization signals. When graphics processor 400 is configured as a slave device, raster lock unit 470 outputs the synchronization signals received from the master device. When graphics processor 400 is configured as a master device, raster lock unit 470 outputs the synchronization signals generated by the timing generation circuitry. In some embodiments of the present invention, the master graphics device advances the synchronization signals to compensate for delay incurred as the synchronization signals are passed through second dedicated interface 447 to a slave device. In other embodiments of the present invention, each slave device advances the synchronization signals as needed to compensate for the delay incurred between each of the slave devices and the master device.

Figure 5A:
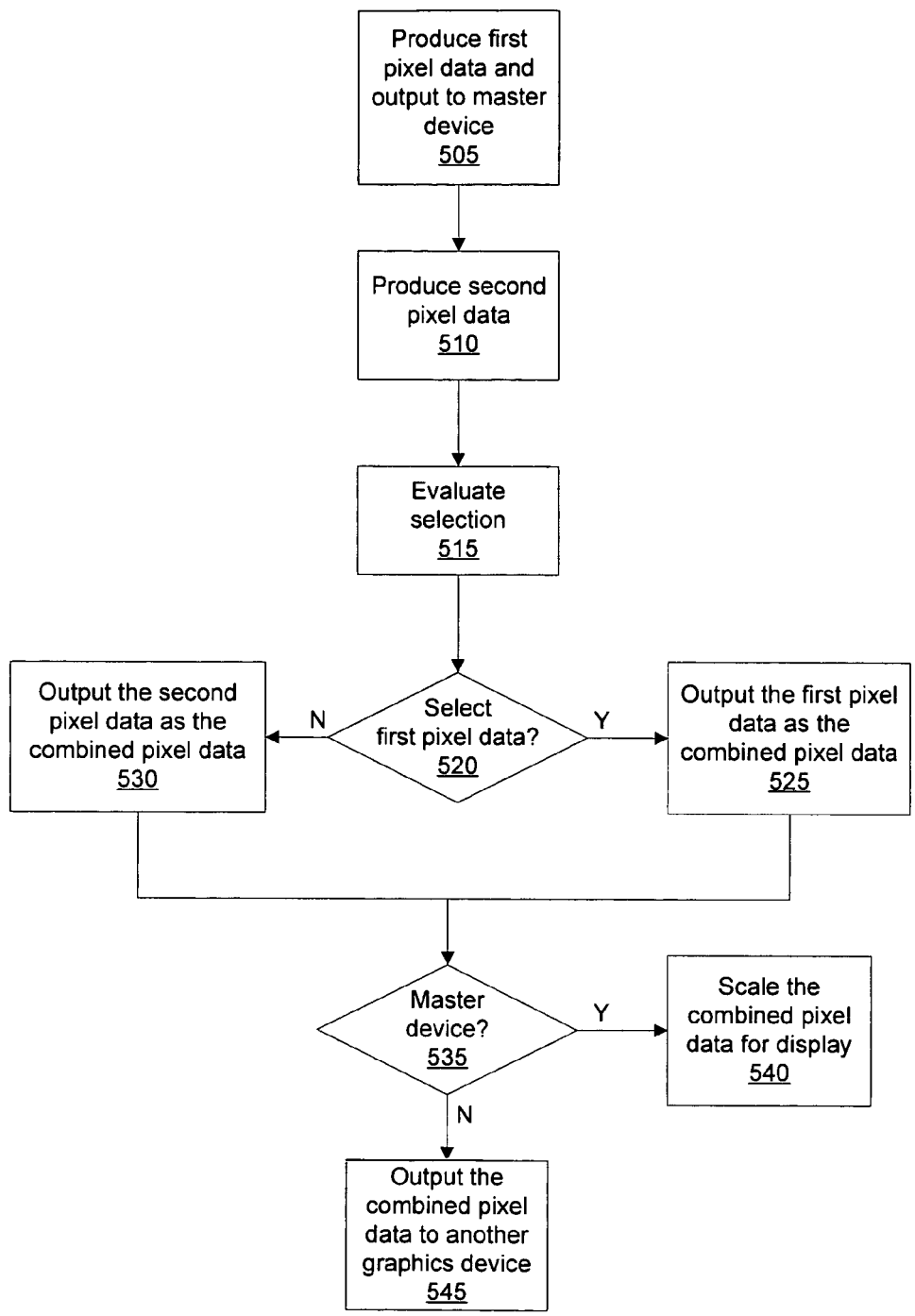
FIG. 5A is an exemplary embodiment of a method of combining pixel data produced by multiple graphics adapters in accordance with one or more aspects of the present invention.
Figure 5B:
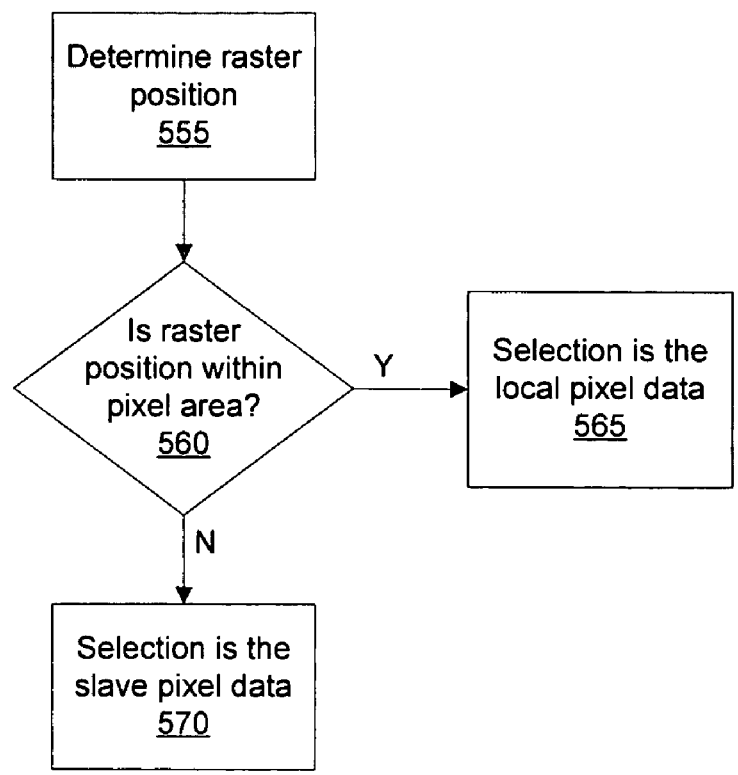
FIG. 5B is an exemplary embodiment of a method of selecting pixel data produced by multiple graphics adapters in accordance with one or more aspects of the present invention.

Selection control 450 uses the raster position information and the programmed pixel area to determine which pixel data to select for output to Final Pixel Processing Unit 440, as described in conjunction with FIG. 5B. In some embodiments of the present invention the programmed pixel area is output by selection control 450 to display pipeline 465 to control which pixels are read from the frame buffer, thereby eliminating unnecessary reads of pixels which will not be selected for output by combiner unit 435.

As previously described, when a graphics device is configured as a master graphics device, the timing generation circuitry within raster lock unit 470 generates synchronization signals, specifically a horizontal sync and a vertical sync using techniques known to those skilled in the art. When a graphics device is configured as a slave graphics device it receives the synchronization signals generated by the master graphics device via a first dedicated interface. The synchronization signals (received or generated by raster lock unit 470) are output by raster lock unit 470 to a slave graphics device via a second dedicated interface. The synchronization signals are also output by the master graphics device to the display device. FIFO 455 is sized as needed to tolerate skew between the synchronization signals received by each of the multiple graphics devices. The synchronization signals are processed by raster lock unit 470, using techniques known to those skilled in the art, to produce the raster position information that is output to selection control 450 and display pipeline 465.

A buffer swap signal may also be included in the dedicated interface for use in producing the combined pixel data. Each graphics processor generates a swap signal indicating whether or not it has finished processing pixel data for an image and is ready to read the pixel data from the frame buffer memory. The swap signal is input to raster lock unit 470 and is used to control the buffer swap signal. The buffer swap signal is a tristate signal, specifically a wired AND using a pull-up component that is pulled low by each graphics device that is not ready to swap buffers and is tristated by each graphics device that is ready to swap buffers. Each graphics device also samples the buffer swap signal to determine when all of the graphics devices are ready to swap buffers. The buffer swap signal is monitored by and controlled by raster lock unit 470 and is connected through each graphics device via one or more of the dedicated interfaces.

An output unit 445 within combiner unit 435 receives the combined pixel data and output the combined pixel data to either final pixel processing unit 440 or another graphics device. When a graphics device is configured as a master device, output unit 445 outputs the combined pixel data to final pixel processing unit 440 and when the graphics device is configured as a slave device, output unit 445 outputs the combined pixel data to the master device directly or to the master device via another slave device. Therefore, combined pixel data output by a slave graphics device may be combined with additional pixel data produced by another slave graphics device before reaching the master graphics device.

Final pixel processing unit 440 receives the combined pixel data output by combiner unit 435. When configured as a master graphics device, final pixel processing unit 440 converts the combined pixel data as needed for display, dependent on the type of display, to produce the displayable image. The pixel data is combined in the digital domain by the master graphics device to produce a complete image before being converted to a displayable image. Therefore, digital to analog conversion is performed in a single graphics processor, avoiding image artifacts resulting from DAC mismatches between multiple graphics devices.

Figure 4C:
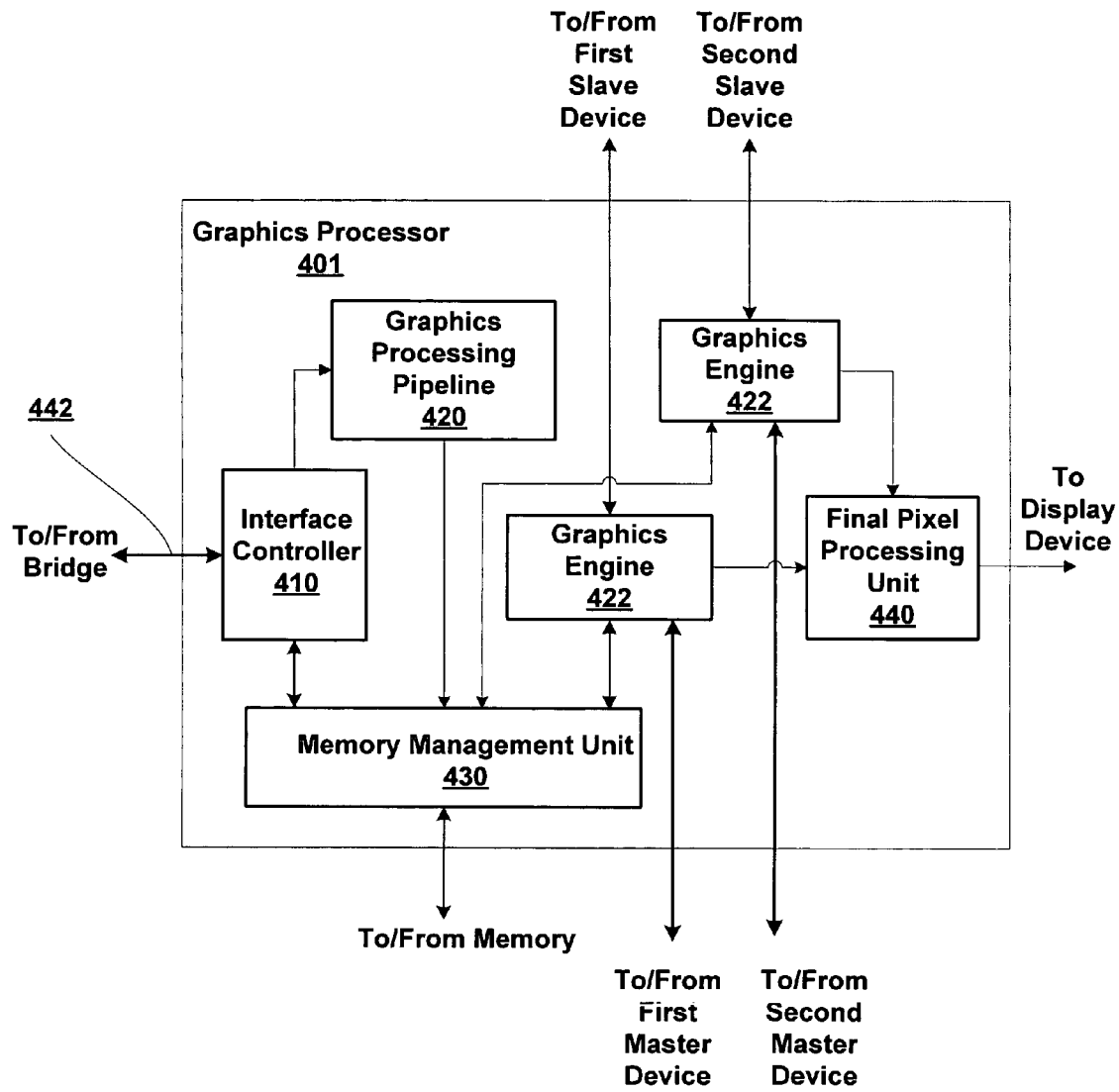
FIG. 4C is a block diagram of another exemplary embodiment of a graphics processor in accordance with one or more aspects of the present invention.

FIG. 4C is a block diagram of another exemplary embodiment of a graphics device, Graphics processor 401, in accordance with one or more aspects of the present invention. Graphics processor 401 includes the elements shown in graphics processor 400 of FIG. 4A. Specifically, each graphics engine 422 includes a display pipeline and timing generator 425 coupled to a combiner unit 435. Graphics processor

401 includes an additional slave graphics device port and an additional master graphics device port compared with graphics processor 400. Therefore, graphics processor 401 may connect to four different devices. Each graphics engine 422 may be configured independently as either a master or a slave engine and final pixel processing unit 440 may output displayable images to two display devices. Alternatively, final pixel processing unit 440 may output combined pixel data produced by one graphics engine 422 and output a displayable image produced from combined pixel data produced by the other graphics engine 422. Final pixel processing unit 440 may also output combined pixel data from both graphics engines 422 to two master graphics devices via separate dedicated interfaces.

FIG. 5A is an exemplary embodiment of a method of combining pixel data produced by multiple graphics adapters in accordance with one or more aspects of the present invention. In step 505 a first portion of an image is processed by a first device, a slave graphics device, such as slave graphics adapter 260 or 360, GPU 325, or graphics processor 400 to produce first pixel data. The first device outputs the first pixel data to a second device, either a master graphics device or a slave graphics device, via a first dedicated interface. The first pixel data may include pixel data produced by the first device that has been combined within the first device with pixel data produced by another slave graphics device. Synchronization signals output to the first device by the second device are used to select pixel data for output, thereby synchronizing the combined pixel data as needed for the display device. A buffer swap signal may also be used to select pixel data for output. In step 510 a second portion of an image is processed by the second device, such as slave graphics adapter 260 or 360, master graphics adapter 240 or 340, GPU 325, or graphics processor 400, to produce second pixel data.

Processing of the image may be distributed between a master graphics device and one or more slave graphics devices based on the processing capability of each graphics adapter. The processing capability may include performance characteristics such as frame rate, primitives rendered per second, texture rendering speed, image resolution, or the like. The processing capability may include image quality characteristics such as trilinear filtered texture mapping, antialiasing, multiple light sources, or the like.

In step 515 a selection control 450 within the second device evaluates a selection based on one or more programmed values defining a pixel area and raster position information provided by raster lock unit 470. The selection evaluation is described in conjunction with FIG. 5B. In step 520 mux 460 determines if the first pixel data, received from the first device, should be selected and output to the final pixel processing unit 440. If, in step 520 mux 460 selects the first pixel data, then in step 525 mux 460 outputs the first pixel data as the combined pixel data 525. If, in step 520 mux 460 does not select the first pixel data, then in step 530 mux 460 outputs the second pixel data as the combined pixel data.

Continuing with step 535, the second device determines if it is configured as a master graphics device or as a slave graphics device. If, in step 535 the second device is configured as a master graphics device, then in step 540 final pixel processing unit 440 scales the combined pixel data for the display device and outputs the scaled combined pixel data to the display device. In step 540 the second device also outputs the horizontal sync and vertical sync generated by raster lock unit 470 to the display device and outputs the synchronization signals to the first device. Raster lock unit 470 adjusts the buffer swap signal as needed based on the swap buffer received from the local graphics processing pipeline.

If, in step 535 the second device is not configured as a master graphics device, then in step 545 combiner unit 435 outputs the combined pixel data to the master graphics device via a second dedicated interface between the master graphics device and the second device. The second device also outputs the synchronization signals received from the master graphics device to the first device and raster lock unit 470 adjusts the buffer swap signal as needed based on the swap buffer received from the local graphics processing pipeline.

FIG. 5B is an exemplary embodiment of a method of selecting pixel data produced by multiple graphics adapters in accordance with one or more aspects of the present invention. In step 555 selection control 450 determines the current pixel position for the display device, e.g., raster position, based on the raster position information received from raster lock unit 470. Specifically, selection unit 450 may determine a horizontal position and a vertical position.

In step 560 selection control 450 determines if the raster position is within the pixel area defined for the graphics device. If, in step 560 selection control 450 determines the raster position is within the pixel area, then in step 565 a select signal output by selection control 450 to mux 460 selects the locally generated pixel data output by display pipeline 470 to combiner unit 435. All of the pixel data within a pixel area processed by the local graphics processing pipeline are selected for output by mux 460 as combined pixel data. If, in step 560 selection control 450 determines the raster position is not within the pixel area, then in step 570 the select signal output by selection control 450 to mux 460 selects the pixel data output by FIFO 455 that was received from a slave graphics device via a dedicated interface. Therefore, pixel data may be selected on a pixel-by-pixel basis.

The dedicated interface including pixel data and synchronization signals provides a point-to-point connection between each of the multiple graphics devices. A portion of an image, may be produced by each of the multiple graphics devices and each graphics device combines locally produced pixel data for one portion of the image with other pixel data, received from a slave graphics device, for one or more other portions of the image. Because a single device, the master graphics adapter performs the digital to analog conversion, artifacts resulting from DAC mismatches between the multiple graphics devices are not introduced into the image when it is converted for display. Therefore, graphics processing performance may be improved by adding an additional graphics device to a system without introducing visual artifacts due to DAC mismatches.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A graphics processor device, comprising:
   a second dedicated interface configured to provide a point-to-point connection between the graphics processor device and a first slave graphics device for the transfer of digital pixel data and synchronization signals;
   a graphics processing pipeline;
   a combiner unit configured to select on a pixel-by-pixel basis, between pixel data generated locally within the graphics processing pipeline and pixel data generated by the first slave graphics device and received from the first slave graphics device through the second dedicated interface, to produce first combined pixel data that is output to a first dedicated interface;

a final pixel processing unit coupled to the combiner unit and configured to receive the first combined pixel data and produce a displayable image for output to a display device;

and a raster lock unit coupled to the combiner unit and configured to generate the synchronization signals for synchronizing the displayable image output to the display device, wherein the synchronization signals are transmitted to the first slave graphics device through the second dedicated interface.

2. The graphics processor device of claim 1, further comprising a second combiner unit configured to output second pixel data generated locally within the graphics processing pipeline to the final pixel processing unit.

3. The graphics processor device of claim 2, wherein the second combiner unit is configured to select on a pixel-by-pixel basis, between the second pixel data generated locally within the graphics processing pipeline and pixel data generated by a second slave graphics device and received through a third dedicated interface, to produce second combined pixel data.

4. The graphics processor device of claim 1, wherein the first dedicated interface and the second dedicated interface are provided using multi-purpose pins of a package enclosing the graphics processor device.

5. The graphics processor device of claim 1, wherein the pixel data generated locally within the graphics processing pipeline includes any overlay planes or a cursor.

6. The graphics processor device of claim 1 wherein the raster lock unit is configured to control and monitor a buffer swap signal included within the second dedicated interface.

7. The graphics processor device of claim 1, wherein the first combined pixel data is scaled by the final pixel processing unit to produce the displayable image.

8. The graphics processor device of claim 1, wherein the first combined pixel data includes pixel data generated locally within the graphics processing pipeline that is within a first specified pixel area.

9. The graphics processor device of claim 8, wherein the pixel data generated by the first slave graphics device is within a second specified pixel area and the second specified pixel area is larger than the first specified pixel area.

10. The graphics processor device of claim 1, wherein the pixel data generated by the first slave graphics device includes pixel data generated by a second slave graphics device.

11. The graphics processor device of claim 1 wherein a raster lock unit within the first slave graphics device receives the synchronization signals output by the raster lock unit within the graphics processor device.

12. The graphics processor device of claim 1, wherein the graphics processor device is directly coupled to the display device and the first slave graphics device is coupled to the display device through the graphics processor device.

13. The graphics processor device of claim 1, wherein the first slave graphics device comprises a first slave graphics processing unit.

14. The graphics processor device of claim 13, wherein the first slave graphics processing unit comprises a first slave graphics pipeline configured to generate the pixel data generated by the first slave graphics device.

15. The graphics processor device of claim 1, wherein the synchronization signals include a horizontal sync and a vertical sync corresponding to the display device.

16. A method of combining pixel data produced by multiple graphics processor devices within one of the multiple graphics processor devices to produce displayable image data, comprising:

processing first graphics data within a first graphics pipeline within a first graphics processor device of the multiple graphics processor devices to produce first pixel data and outputting the first pixel data to a dedicated interface to a second graphics processor device of the multiple graphics processor devices, wherein the dedicated interface is a point-to-point connection between the first graphics processor device and the second graphics processor device for the transfer of digital pixel data and synchronization signals;

processing second graphics data within a second graphics pipeline within the second graphics processor device to produce second pixel data;

generating the synchronization signals within the second graphics processor for synchronizing the displayable image data, wherein the synchronization signals include raster position information and are transmitted to the first graphics processor device through the dedicated interface;

selecting, on a pixel-by-pixel basis, within the second graphics processor device, between the first pixel data and the second pixel data based on the raster position information to produce combined pixel data; and processing the combined pixel data to produce the displayable image data for direct output to a display device.

17. The method of claim 16, wherein the selection is based on a buffer swap signal.

18. The method of claim 16, wherein the raster position information includes a horizontal position and a vertical position of the display device.

19. The method of claim 16, wherein the processing of the combined pixel data includes converting the combined pixel data from a digital format to an analog format.

20. The method of claim 16, wherein the first pixel data represents a first frame of the displayable image data and the second pixel data represents a second frame of the displayable image data.

21. The method of claim 16, wherein the raster position information is generated using a horizontal sync signal and a vertical sync signal received by the second graphics processor device.

22. The method of claim 16, wherein the processing of the combined pixel data includes scaling the combined pixel data for output to a flat panel display device.

* * * * *